Oct. 14, 1941.　　　A. R. PATRICK　　　2,258,798
VEHICLE BRAKE LOCK
Filed Dec. 16, 1940
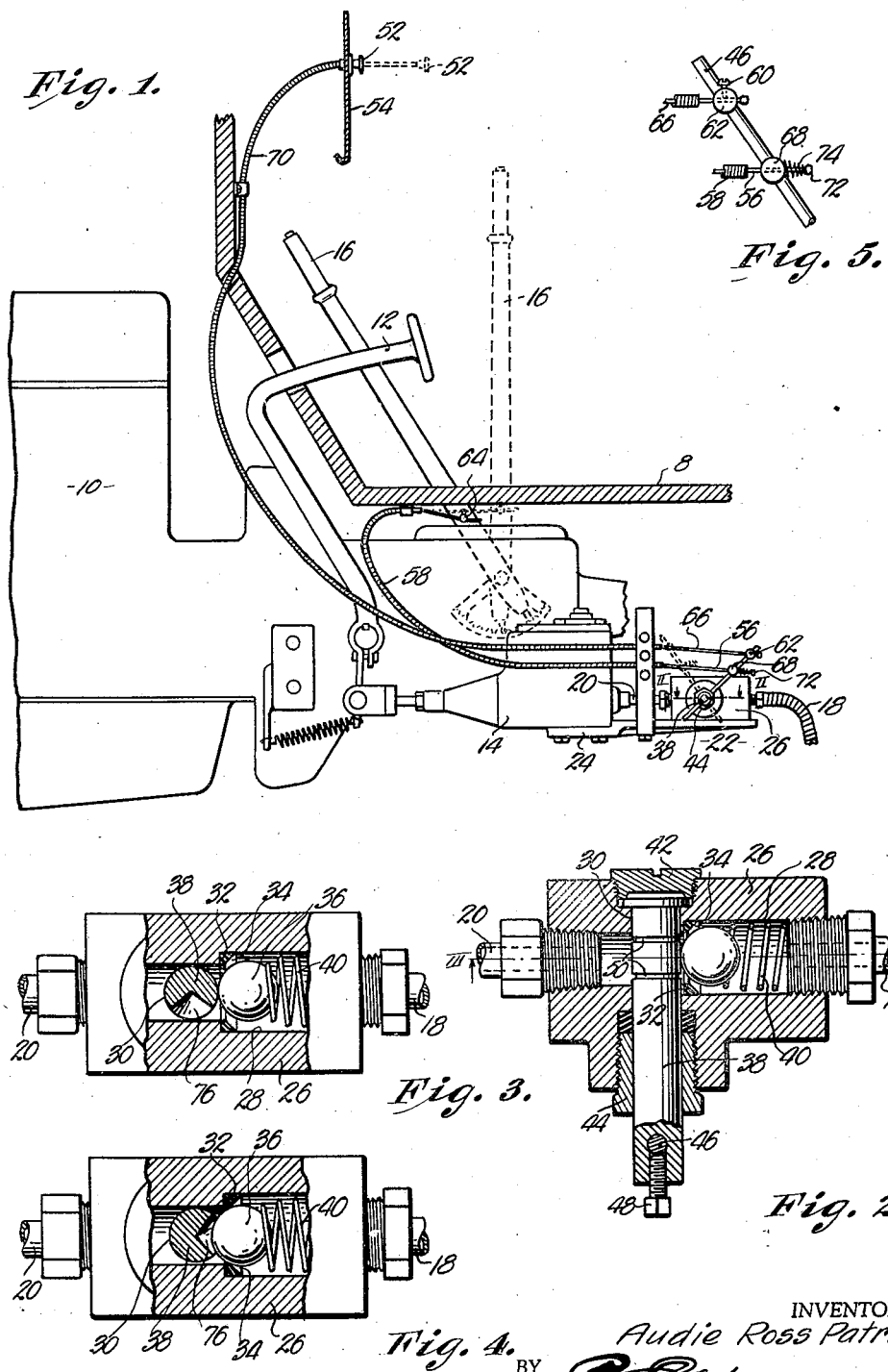
INVENTOR.
Audie Ross Patrick Patented Oct. 14, 1941

2,258,798

UNITED STATES PATENT OFFICE 2,258,798

VEHICLE BRAKE LOCK

Audie Ross Patrick, Kansas City, Mo.

Application December 16, 1940, Serial No. 370,336

9 Claims. (Cl. 188—152)

This invention relates to automobile braking systems and has for its primary object, the provision of locking means for one braking system of the automobile when the second braking system thereof is in the brake-setting position.

A further object of this invention is to provide means for precluding the release of the fluid braking system of an automobile when the emergency braking system thereof is in the brake-setting position, said means being attachable to the automobile as an accessory or capable of forming a part of the original structure.

This invention has for a further aim, the provision of locking means for the fluid braking system of an automobile, which means is movable to the operative position when the emergency brake system of the automobile is in the brake-setting position, and that has a manually operative connection extending to within reach of the driver for moving the lock to an inoperative condition.

An even further object of this invention is the provision of novel, unique and efficient means for locking the primary braking system of an automobile against accidental release when the secondary braking system thereof is set, said locking means remaining in an operative condition after the secondary braking system has been released until a manually controllable part accessible to the driver and independent of either braking system is manipulated.

Further objects of this invention include the special form of locking valve that is employed with the fluid braking system and which is operably joined to the emergency brake lever and to an accessible knob or the like on the instrument panel of the automobile.

Additional objects, both broad and specific, will appear during the course of the following specification, referring to the accompanying drawing wherein:

Fig. 1 is a fragmentary sectional view through a portion of an automobile showing parts of the primary and secondary braking system with the lock embodying this invention combined therewith.

Fig. 2 is an enlarged fragmentary sectional view through the valve member taken on line II—II of Fig. 1.

Figs. 3 and 4 are vertical cross sectional views taken on line III—III of Fig. 2; and Fig. 5 is an enlarged detailed elevational view illustrating the manner of connecting the two operating cables to the arm of the valve.

The automobile generally designated by the numeral 8, is equipped with an internal combustion engine 10, a primary braking system including the foot lever 12, and master cylinder 14, and a secondary or emergency braking system having the hand operated lever 16. These conventional parts are well-known in the art and master cylinder 14 is suitably mounted for operation by lever 12 and joined to the brakes at the wheels of automobile 8 through the medium of a tube 18, a section of which is designated by the numeral 20 and joins master cylinder 14 and valve 22. This valve is carried by bracket 24 adjacent to master cylinder 14 and comprises a body 26 preferably cast with a passage 28 therethrough which communicates with tubing sections 18 and 20 to complete a conduit for the brake fluid.

A bore 30 is formed through body 26 in a direction at right angles to the axis of passage 28 and intersects the latter as shown in Fig. 2.

The diameters of passage 28 and bore 30 are substantially the same and the insert 32 forms a seat 34 within the body. This seat 34 cooperates with floating valve member 36 in the form of a ball that is yieldably held against either seat 34 or control element 38, as the case may be, by spring 40.

Control element 38 is journalled in bore 30 and held therein by plug 42 and packing nut 44. One end of control element 38 projects beyond the confines of body 26 to be engaged by arm 46, one end of which is held in place by set screw 48.

Annular grooves 50 formed around control element 38 where the same intersects passage 28, permits movement of fluid through this said passage 26 when ball 36 is not seated.

The free end of arm 46 is connected both to emergency brake lever 16 and to a knob 52 on the instrument panel 54 of automobile 8. The connection to lever 16 is in the form of a housed piano wire or flexible cable 56 that passes through flexible tube 58. One end of wire 56 is slidably engaged by stud 68, pivotally mounted on arm 46. The other end of wire 56 is secured directly to lever 16 as at 64. Another wire 66 has one end thereof clamped as at 60 to stud 62 that is likewise pivotally joined to arm 46. The other end of wire 66 carries knob 52 and the wire is housed within flexible tubing 70, as illustrated in Fig. 1.

Head 72, integral with wire 56 at the end thereof, engaged by stud 68, assists in holding a spring 74 in the operative position between stud 68 and said head.

When the brake lock is in operation, it insures the driver of the automobile 8 that accidental release of the secondary braking system will not allow the automobile to coast down an incline, for example. When the primary braking system is set or the lever 12 thereof is depressed to force fluid from master cylinder 14 to the brakes of the wheels through tubing 20 and 18, pressure is maintained in tubing 18 by holding the lever 12 depressed until the secondary braking system lever 16 is moved from the position shown in full lines of Fig. 1 to the position illustrated in dotted lines therein. When such action takes place, wire 56 is moved to draw arm 46 to the position shown in dotted lines of Fig. 1, whereupon control element 38 will be rotated where cavity 76 therein receives ball 36 and allows spring 40 to force the ball against seat 34. This movement of control element is from that shown in Fig. 3 to the position shown in Fig. 4 and not only does the action just described, set the secondary or emergency braking system, but locks the brakes of the primary braking system against accidental movement to the released condition.

When arm 46 is so moved to the dotted position shown in Fig. 1, wire 66 is forced through tube 70 where knob 52 thereof is projected outwardly. When the driver wishes to proceed, lever 16 is returned to the normal position where the brakes of the emergency or secondary brake system, are released, whereupon wire 56 will slide longitudinally through stud 68 without affecting the position of arm 46. Obviously, the primary brakes will remain set or in the braking position until wire 66 is moved longitudinally by engaging knob 52. When this manually controlled means is actuated to return arm 46 to the normal position shown in full lines of Fig. 1, ball 36 will be lifted from seat 34, spring 40 will be overcome and the lock conditioned where normal operation of the primary braking system is not affected in any manner.

Advantages arising from the vehicle brake lock embodying the concepts of this invention and made as shown in the accompanying drawing, and as is possible under the scope of the following claims, are highly desirable and solve many of the problems presented due to automobile brake failures.

The simplicity of construction and ease of installation insures that the invention may be made as an accessory or a component part of the automobile when first assembled.

Having thus described the invention, what is claimed as new and desired to be secured by Letters Patent is:

1. In an automobile provided with an emergency braking system and a fluid braking system, having a manually controlled lever, the combination of means for precluding release of the fluid braking system after the said lever has been moved to the brake-setting position, said means being connected to parts of the emergency braking system for movement thereby to the operative condition as the said parts of the emergency braking system are moved to their brake-setting position, said means having a manually operative connection extending to a point close to the driver's seat for moving the same to an inoperative condition.

2. In an automobile provided with an emergency braking system and a fluid braking system, having a manually controlled lever, the combination of means for precluding release of the fluid braking system after the said lever has been moved to the brake-setting position, said means being connected to parts of the emergency braking system for movement thereby to the operative condition as the said parts of the emergency braking system are moved to their brake-setting position, said means having a manually operative connection extending to a point close to the driver's seat for moving the same to an inoperative condition, said connection being adapted to move the means to the inoperative condition after the parts of the emergency braking system have been returned to the brake-releasing position from the brake-setting position.

3. In an automobile provided with an emergency braking system and a fluid braking system, having a manually controlled lever, the combination of means for precluding release of the fluid braking system after the said lever has been moved to the brake-setting position, said means being connected to parts of the emergency braking system for movement thereby to the operative condition as the said parts of the emergency braking system are moved to their brake-setting position, said means having a manually operative connection extending to a point close to the driver's seat for moving the same to an inoperative condition, said connection being adapted to move the means to the inoperative condition after the parts of the emergency braking system have been returned to the brake-releasing position from the brake-setting position, said means having elements for causing the same to remain in the operative condition after the parts of the emergency braking system have been returned to the brake releasing position and until the manually operative connection has moved the said means to the inoperative condition.

4. In an automobile provided with a primary fluid braking system and a secondary braking system, each having a manually controlled operating lever respectively, the combination of locking means for the primary braking system having elements settable in the locking position by movement of the lever of the secondary braking system to its brake-setting position after the lever of the primary braking system has been moved to its brake-setting position; and manually controlled means independent of either braking system for moving the locking means to the unlocked position.

5. In an automobile provided with a primary fluid braking system, and a secondary braking system, each having a manually controlled operating lever respectively, the combination of locking means for the primary braking system movable to the operative position by the lever of the secondary braking system after the lever of the primary braking system is moved to the brake-setting position; and manually controlled means independent of either of said levers for moving the locking means when the lever of the secondary braking system is in the brake-releasing position.

6. In an automobile provided with a primary fluid braking system, and a secondary braking system having an operating lever, a lock for the primary braking system comprising a valve in the fluid line of said system; connections joining the valve and the lever of the secondary braking system for closing the valve; and manually controlled means independent of the said lever for opening the valve.

7. In an automobile provided with a primary fluid braking system, and a secondary braking system having an operating lever, a lock for the primary braking system comprising a body having a passage therethrough for the fluid of the primary braking system; a valve seat formed on the body within the passage; a floating valve member in the passage; a spring to yieldably hold the member on said seat to prevent the flow of fluid in a direction to release the braking; a control shaft provided with a cavity therein intersecting the passage, said valve member being a ball movable to and from a position in the cavity as the shaft is rotated about its axis; connections joining the shaft and said lever of the secondary braking system to rotate the shaft and allow the ball to seat when the lever is in the brake-setting position; and manually controlled means independent of the said lever for rotating the shaft to lift and hold the ball from said seat when the lever is in the brake-releasing position.

8. In an automobile provided with a primary fluid braking system, and a secondary braking system having an operating lever, a lock for the primary braking system comprising a body having a passage therethrough for the fluid of the primary braking system; a valve seat formed on the body within the passage; a floating valve member in the passage; a spring to yieldably hold the member on said seat to prevent the flow of fluid in a direction to release the braking; a control shaft provided with a cavity therein intersecting the passage, said valve member being a ball movable to and from a position in the cavity as the shaft is rotated about its axis; connections joining the shaft and said lever of the secondary braking system to rotate the shaft and allow the ball to seat when the lever is in the brake-setting position; and manually controlled means independent of the said lever for rotating the shaft to lift and hold the ball from said seat when the lever is in the brake-releasing position, said manually controlled means being movable to a set position by the said connections between the shaft and said lever when the latter is shifted to the brake-setting position.

9. The structure as set forth in claim 8 wherein the connections between the shaft and said lever permit movement of the lever from the brake-setting position to the brake-releasing position without rotating the said shaft.

AUDIE ROSS PATRICK.